April 4, 1939.  L. E. PADELFORD ET AL  2,152,913
TOASTING MACHINE
Filed Sept. 14, 1935  4 Sheets-Sheet 1
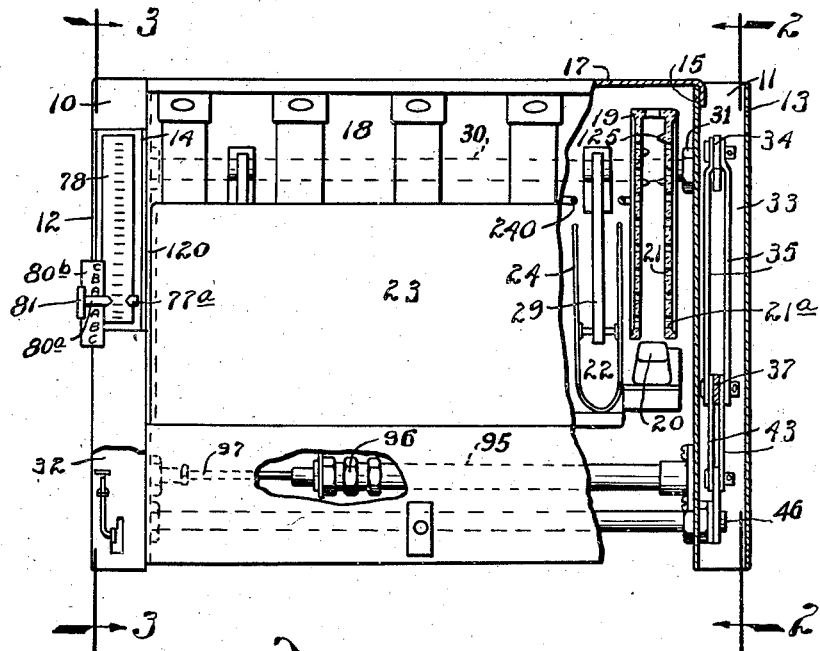
Fig. 1
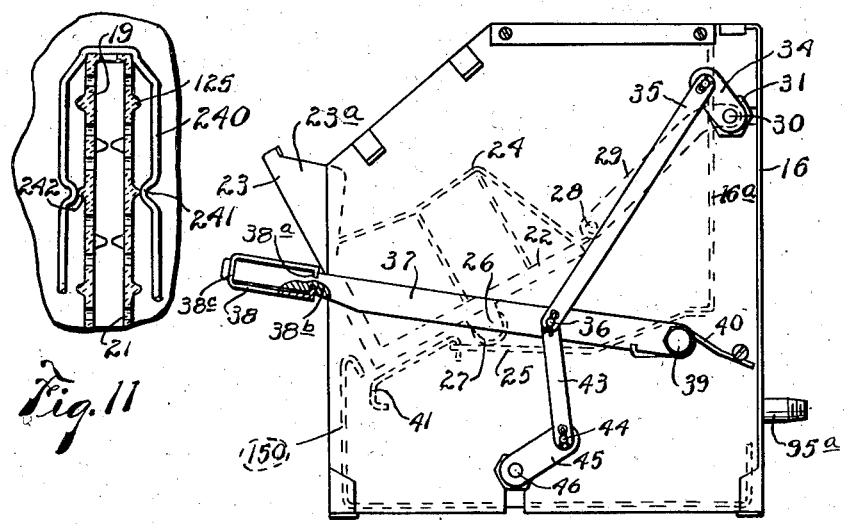
Fig. 11
Fig. 2
INVENTORS
LESTER E. PADELFORD
and JOHN JOSEPH AMBROSE
BY Joseph Farley
ATTORNEY.

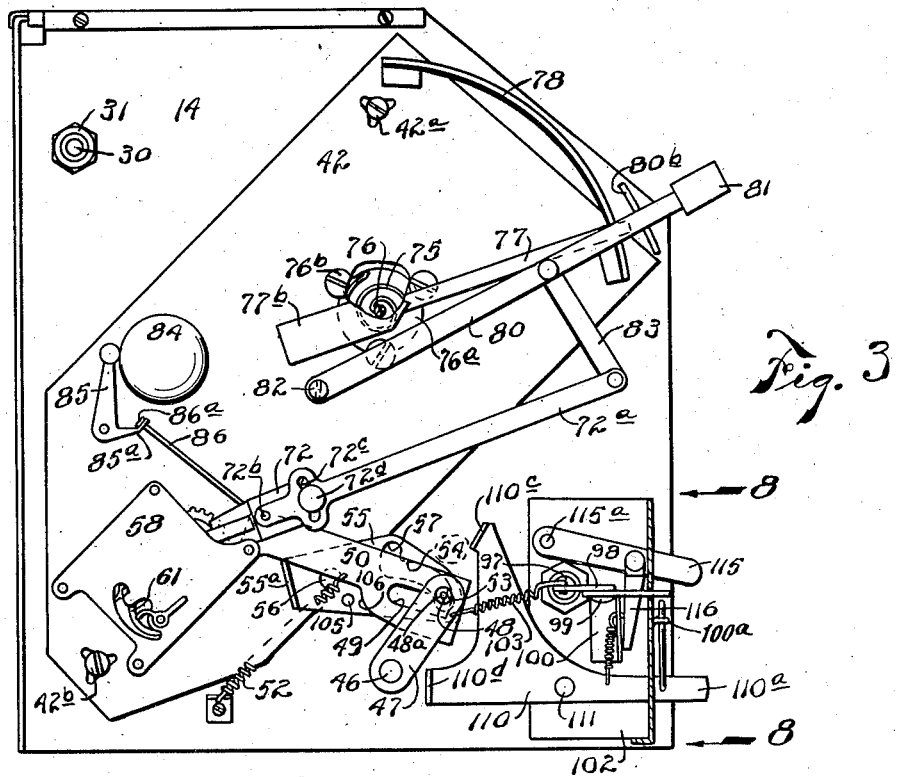

April 4, 1939.　　　L. E. PADELFORD ET AL　　　2,152,913
TOASTING MACHINE
Filed Sept. 14, 1935　　　4 Sheets-Sheet 3
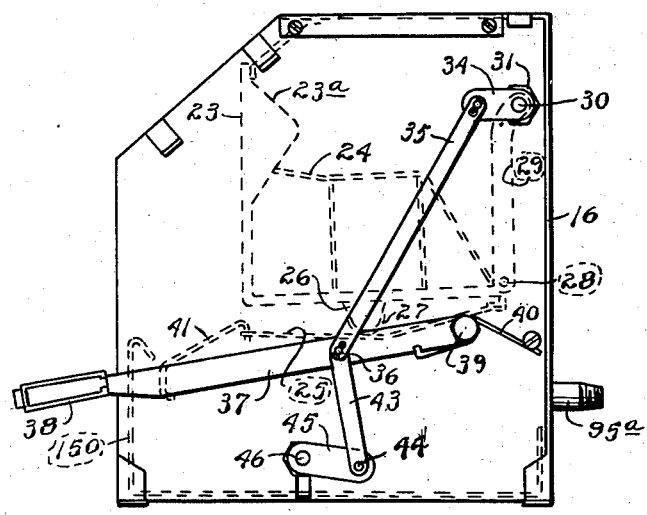
INVENTORS.
LESTER E. PADELFORD
JOHN JOSEPH AMBROSE
BY
Joseph Farley
ATTORNEY.

April 4, 1939.   L. E. PADELFORD ET AL   2,152,913
TOASTING MACHINE
Filed Sept. 14, 1935    4 Sheets—Sheet 4
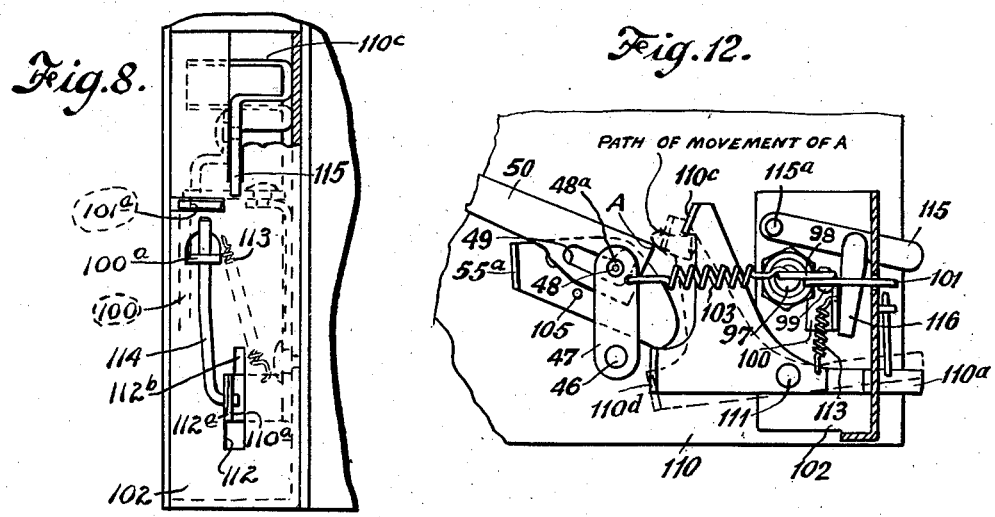
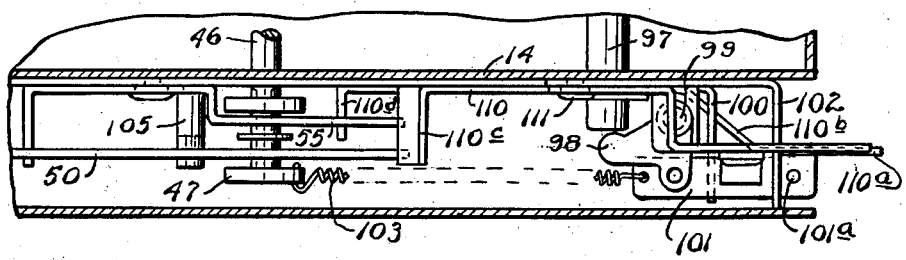
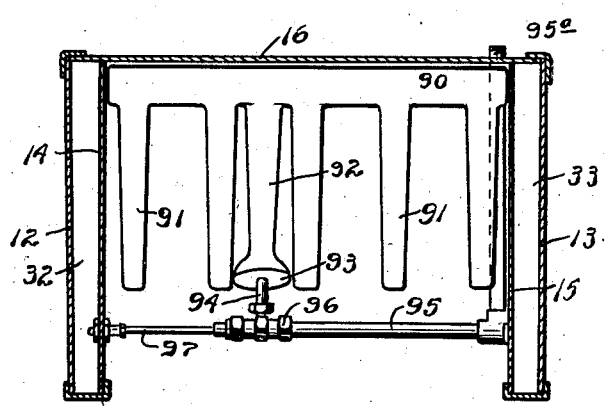
INVENTORS.
LESTER E. PADELFORD
and JOHN JOSEPH AMBROSE
BY
Joseph Farley
ATTORNEY.

Patented Apr. 4, 1939

2,152,913

UNITED STATES PATENT OFFICE 2,152,913

TOASTING MACHINE

Lester E. Padelford, North Arlington, and John Joseph Ambrose, Newark, N. J., assignors to Savory Appliance, Inc., Newark, N. J., a corporation of Delaware Application September 14, 1935, Serial No. 40,536

12 Claims. (Cl. 161—16)

This invention relates to toasters and has for its principal object to provide a new and improved construction of a toaster particularly adapted for restaurant or lunch counter use and capable of toasting a plurality of slices of bread simultaneously and also to accommodate sandwiches as well as single bread slices.

A further object is to provide a new and improved toaster preferably of the gas fired type that will be economical to operate.

Another object is to provide a toaster of the type referred to with means for automatically removing the toast from the heated compartment at the conclusion of the toasting operation.

As the length of time required to properly toast bread depends upon the heat of the cooking compartment, a further object of the invention is to provide a new and improved toasting device with a thermostatically controlled indicator cooperatively associated with means for setting a time controlled automatic mechanism by means of which toast is removed from the toasting compartment after the expiration of a suitable time interval depending upon the temperature of the cooking compartment so as to insure production of a properly browned toast without danger of charring or burning the bread. As the time interval required for the production of proper toast does not vary directly with temperature variations in the cooking compartment but there is a differential relation between temperature and proper toasting time, it is therefore a further object of the invention to interpose, between the time controlled mechanism and the means for setting the same, suitable differential means for obtaining substantially proper toasting periods for different degrees of temperature of the cooking compartment.

The above and other objects of the invention, such as the provision of a simple, inexpensive, but, withal, sturdy and attractive construction of a toasting device capable of withstanding relatively rough usage while operating efficiently in the hands of unskilled operatives, will appear more fully from the following more detailed description and by reference to the accompanying drawings forming a part hereof, wherein is shown a toasting device constructed in accordance with the principles of the present invention which has proven highly satisfactory in actual commercial use.

As shown in the drawings Fig. 1 is a front elevation, partially broken away, of the toasting device.

Fig. 2 is a section on the line 2—2 of Fig. 1, showing the bread carrying member in non-cooking position;

Fig. 3 is a section on the line 3—3 of Fig. 1, showing the mechanism for setting the time controlled mechanism and the trip for automatically releasing the bread carrying member; the parts being shown with the trip in released position;

Fig. 4 is a view, similar to Fig. 2, showing the bread carrying member moved into the cooking compartment;

Fig. 5 is a view similar to Fig. 3 showing the trip in latched position;

Fig. 6 is an enlarged detail in side elevation of the time controlled mechanism showing the parts in locked engagement;

Fig. 7 is an end view of the parts shown in Fig. 6;

Fig. 8 is a front view on an enlarged scale of that portion of the device shown between the arrows 8—8 in Fig. 3, showing the means for setting the gas valve when it is desired to have the oven compartment closed in order to maintain it in partially heated condition;

Fig. 9 is a plan view of the parts shown in Fig. 8;

Fig. 10 is an inverted plan view showing the fuel manifold and supply lines therefor;

Fig. 11 is an enlarged sectional detail of one of the radiants and showing a wire guard secured thereto; and Fig. 12 is a view of a portion of the mechanism shown in Fig. 3 indicating the path of movement of the rocking lever and the cooperation therewith of a tripping and locking device.

As shown in the drawings, the numerals 10 and 11 indicate the side frame members of the toasting device which preferably are of channeled construction and in which are retained the outer side plates 12 and 13 and outer back wall 16. To the inner ends of the channeled members 10 and 11 are secured the inner side plates 14 and 15 which, together with the inner back plate 16a, top plate 17 and a removable crumb tray 150, define an oven compartment 18. Located within the oven compartment 18 are a plurality of radiants 19 constructed of refractory material. These radiants are hollow members of generally rectangular shape closed at their upper and open at their lower ends. Each of said radiants has its lower open end located immediately above a gas burner jet 20, and the vertical side walls thereof, as well as the top, are provided with a plurality of small apertures 21 to permit the escape of the products of combustion. As clearly shown in Fig. 1 of the drawings the radiants 19 are arranged in spaced relationship in the upper part of the oven compartment 18 and into the space between each adjacent pair of radiants is adapted to be received a bread carrying device consisting of a bottom plate 22 secured at its front end to the lower face of a door or closure 23 adapted to close the upper front part of the oven compartment when said door is actuated by means presently to be described, to its closed position. Suitably secured to the upper face of each plate 22 are a pair of spring wire guards 24, which serve to hold the toast slices in upright position and prevent them from coming directly in contact with the heated radiants 19. The guard members 24 have sufficient resiliency to yield and permit the insertion of sandwiches when it is desired to toast a complete sandwich.

In addition to, or in place of, the guard members 24, there may be provided the guard members 240, each of which is preferably formed of a length of spring wire bent to encircle one of the radiants, the latter being provided in the front and rear walls thereof with suitable grooves or recesses in which the guard members are received and held against vertical movement. As shown best in Fig. 11 the guard members 240 are provided with a plurality of inwardly bent re-entrant portions 241 which engage with the projecting radiating ribs 242 of the radiants and serve as braces to limit movement of the guard members towards the radiants. The small contacting area between said ribs and re-entrant portions 241 precludes overheating of the guard members and consequent burning of the toast while at the same time as the guard members become heated, there is avoided that streaking of the toast with white untoasted portions, such as occurs with guard members which are moved out of the oven at the end of each toasting operation.

As will be seen from the foregoing, the door or closure 23, together with the plates 22 and guards 24, forms a unitary structure which in the particular modification disclosed in Fig. 1 of the drawings is capable of holding four bread slices or sandwiches and toasting them simultaneously when the bread or toast carrying device is moved into the oven compartment. The bread carrying device is supported and guided for movement into and out of the oven on a pair of tracks, or runways 25, suitably supported in the bottom of the oven compartment immediately below the two end plates or trays 22. Secured to the bottom of each of these trays is a small bracket 26, carrying a roller 27, which is adapted to roll upon the tracks 25. At the inner end of each of the end trays 22 is pivotally secured, as at 28, one end of a guide link 29, the other end of which is anchored to a shaft 30 extending across the rear of the device and located in a housing formed between the back plate 16 and the rear inner wall 16a of the oven compartment, the ends of the shaft 30 being rotatably supported in suitable bearings held by the nuts 31 in the inner side walls 14 and 15.

As will be seen from an inspection of Fig. 1 the side walls 12 and 14 located at the left hand side define a housing 32 in which is located the time controlled and latching mechanism presently to be described, while the end of walls 13 and 15 at the right hand side, define a similar housing or compartment 33 in which is located the mechanism for actuating the shaft 30 and bread trays into and out of the oven compartment.

The shaft 30 has its one end projecting into the housing 33 and has secured thereto, as shown in Fig. 2, one end of a small lever arm 34, to the other end of which is pivotally connected a pair of actuating rods 35. The other ends of the actuating rods 35 are pivotally connected at 36 to an operating lever 37, which projects outwardly through a suitable slot formed in the side frame member 11 and terminates in a handle 38 of novel construction, later to be more fully described. The pivotal connection between the rods 35 and operating lever 37, as clearly shown in Fig. 2, is located between the ends of said lever 37 and the inner end of the said lever is pivoted upon a bolt 39 suitably supported upon the end wall 15 of the oven. A coil spring 40 coiled about the bolt 39 has one end thereof bearing against the under side of the lever 37 and the other end thereof suitably anchored to a fixed part of the casing so as to normally urge the lever 37 into its upper position shown in Fig. 2 of the drawings.

When the bread carrying assemblage comprising the trays 22 and oven door 23 is moved within the oven compartment to the position shown in Fig. 4 of the drawings, additional tension is placed upon the spring 40 so that when the latching device, presently to be described, is released, the lever 37 is moved upwardly under the influence of the spring 40 and, through the connections between said lever and the links 29, the rear end of the tray is tilted upwardly. This causes the oven door, which is comparatively heavy, to be tilted out of the vertical position shown in Fig. 4 and the weight of the oven door then serves to cause the bread carrying assembly to be carried by gravity to the fully opened position shown in Fig. 2, the whole assemblage pivoting upon the rollers 27 and the front lower end of the door sliding over, but out of contact with, the inclined upper portion of the cross brace member 41.

The housing 32 located at the left hand side, Fig. 1, of the drawings, as hereinbefore pointed out, encloses the latching and time controlled mechanism. The latter parts are preferably assembled upon a removable back plate 42, see Figs. 3 and 5, which after the parts have been assembled thereon, is adjustably secured to the inner end wall 14 by a pair of screws 42a, 42b, passing through elongated holes in said back plate and into screw threaded openings for their reception in the side wall 14. It will be noted by referring back to Fig. 2 of the drawings that a pair of links 43 have their upper end connected to the lever 37 at the pivotal point 36, the lower ends of the links 43 being pivotally connected, as at 44, to the outer end of a lever 45, the other end of which is secured to one end of a rod 46 mounted for rotation in suitable bearings provided on the end walls 14 and 15. The other end of the rod 46 projects through the end wall 14 into the left hand housing 32 and, as shown in Fig. 3, has secured to it one end of a lever arm 47. Suitably secured in the other end of the lever arm 47 is a pin 48, preferably provided with a roller 48a, which projects through a slot 49 in a spring winding plate 50, which at its rear end is pivotally secured, as shown most clearly in Fig. 6, to a latch carrying plate 51, which presently will be more fully described. Between the front and rear ends thereof the plate 50 has secured to it one end of a spring 52 the other end of which spring is suitably anchored to a fixed part of the casing, as shown in Fig. 3 of the drawings. The spring 52 normally serves to urge the front end of the spring winding plate 50 downwardly and so that a notch 53 in the upper end of the slot 49 will drop down into engagement with the pin 48 carried by the lever 47. The pin 48 also projects through a cam slot 54 in a latch plate 55, the latter being pivoted off-center upon a pivot pin 56 projecting from the back plate 42. The rear end of the cam slot 54 in the latch plate 55 terminates in a notch 57 with which the pin 48, carried by the lever 47, is caused to engage in a manner presently to be more fully described.

The time controlled mechanism indicated generally by the reference character 58, is of standard construction, forms no part of the present invention per se and is of the type shown and described in United States Letters Patent No. 1,790,083. This mechanism is mounted upon the backing plate 42 and such mechanism includes a main spring 59, see Fig. 6, a suitable gear train driven by the main spring, the usual balance wheel and spring and an escapement mechanism, which latter parts are not shown as the details thereof form no part of the present invention. The outer end of the main spring 59 is anchored to a pin 62 projecting laterally from the latch carrying plate 51 and the other end of said spring is suitably secured to the main shaft 63 of the time controlled mechanism. The main spring 59 is confined between the latch carrying plate 51 and a washer 64 mounted on said main shaft 63. Immediately adjacent to the washer 64 there is secured to the main shaft 63 a latch dog 65 formed integrally with a hub 65c. The hub 65c projects rotatably through the central aperture of the main driving gear 66 of the time controlled mechanism. Mounted on the hub 65c is a pair of friction discs 67, one of which abuts against a shoulder formed on the hub 65c and is confined between said shoulder and the inner face of the gear 66 while the other disc 67 presses against the outer face of the gear 66 and both plates are placed under sufficient frictional tension when assembled upon the hub 65c to insure the driving action of the driving gear while permitting a certain slippage of the gear for a purpose presently to be more fully described; the plates being held under tension by peening over the reduced end of the hub 65a when the parts are assembled.

A latch 68 is pivoted upon the latch carrying plate 51, as at 69, the latch 68 having a pair of teeth 68a and 68b (Fig. 6) which are normally urged into engagement by a spring 69a with a pair of catches 65a and 65b on the dog 65. The end of the latch 68 opposite the pivot point 69 has projecting laterally therefrom a small pin upon which is mounted a roller 70 adapted to engage with a cam arm 71 projecting downwardly from the side of a setting lever 72 for the time controlled mechanism. The lever 72 is pivotally supported at its inner end upon the main shaft 63 of the time controlled mechanism.

As hereinbefore pointed out the invention includes means for regulating the time interval that elapses after the bread holding trays are moved into the oven compartment and as the length of time required for securing properly browned and not burnt toast must be varied to compensate for variations in the temperature in the oven compartment, the present invention includes a thermostatic element 75 of the bi-metallic coil spring type, having one end thereof suitably secured to a pin 76 rotatably mounted in and projecting transversely through an adjustable plate 76a, held in position on the back plate 42 by a plurality of screws 76b in such manner that by loosening the screws 76b the plate 76a and parts carried thereby may be rotated to desired adjusted position. The other end of the thermostatic member 75 is anchored to a small bracket (not shown) secured to the inner face of the plate 76a. Suitably secured to the pin 76 is an indicating arm 77, the end of which terminates in an indicating pointer 77a adapted to be moved under the influence of the thermostat 75 across the face of an arcuate indicating scale 78 mounted in the top of the housing 32 and clearly visible through an opening provided in the side frame member 10. A timer lever 80 having its outer end provided with a finger grip portion 81 is pivoted at its inner end upon a pin 82 fastened in the back plate 42, the pivotal point 82 of the lever 80 coinciding with the center of the arc upon which the arcuate scale plate 78 is struck. Projecting laterally from the side of the lever 80 so as to extend over and just above the scale 78 is an indicating pointer 80a having a scale 80b associated therewith, the scale having suitable scale divisions and preferably the indicia Light and Dark below and above the pointer 80a to indicate the proper setting of the time control when lighter or darker toast is desired.

As the variations in the proper period of time for the toasting operation do not vary directly as variations in temperature readings as shown by the indicator 77, 77a, the setting of the lever 72 which carries the cam arm 71 is effected through a linkage mechanism connecting the lever 72 and the timer lever 80. This linkage mechanism comprises a connecting link 83 having one end thereof secured to the lever 80 and the other end connected to a rod 72a (which is in prolongation of the lever 72) by the pivot pin 72b and adjustable slot and screw 72c, 72d respectively, the adjustment provided by the slot 72c and screw 72d providing means for adjusting the proper relationship between the lever 80 and 72 after the parts are assembled.

The device also preferably includes an alarm to indicate the end of a toasting operation, which as shown, takes the form of a bell 84 mounted upon the back plate 42 and a bell clapper 85 connected by a small rod 86 to the plate 50, the rod 86 passing freely through an aperture formed in an arm 85a at the lower end of the clapper, and the rod 86 being provided with an enlarged head 86a that serves to actuate the bell clapper 85, as will presently be described.

The toaster of the present invention is preferably a gas heated toaster which devices are more economical to operate than electrical heating elements. The gas is supplied to the gas jets 20 from a manifold 90 having a plurality of manifold branches 91 which terminate at their upper ends in the jets 20. Gas is supplied to the manifold through a conduit arm 92 thereof which arm at its outer end is formed to provide a mixing valve 93 constructed in the usual manner of devices of this character. Gas flows into the mixing valve through a jet nozzle 94 projecting laterally from a gas supply pipe 95 having a branch 95a which extends rearwardly and projects outwardly through a hole in the rear wall 16 of the toaster. Adjacent to the jet nozzle 94 the gas supply line 95 is provided with a valve 96 which is caused to be actuated automatically to turn the gas on fully when, in the normal operation of the device, the bread trays are moved into the oven compartment and when the bread trays are moved outwardly from the oven compartment means are provided to actuate the gas valve to cut down the flow of the gas and supply merely a sufficient amount to provide a pilot flame. This means consists of a valve actuating rod 97 which projects at one end into the housing in which the valve 96 is enclosed and at its other end extends through a suitable bearing mounted on the end wall 14. The projecting end of the rod 97 terminates adjacent to the end of one arm in a small bell crank lever 98 (see Figs. 5 and 9) which is pivoted, as at 99, upon a small bracket 100 supported on the end wall 14. The other end of the bell crank lever 98 is pivotally connected to a slide 101, one end of which projects outwardly through a slot formed in an angle plate member 102 fastened on the end wall 14. To the inner end of the slide 101 is connected one end of a coil spring 103 the other end of which is suitably anchored to a projecting arm of the lever 47.

The operation of the parts so far described is as follows: With the parts in the position shown in Fig. 2, in which the bread trays 22 and upper oven door 23 are in their downward position with the door 23 swung away from the oven compartment and all of the parts tilted so that free access can be had for the insertion of bread slices between the guards 24, slices of bread or sandwiches may be placed on one or more of the bread trays. The handle 38 is then depressed, said handle swinging the lever 37 upon its pivot 39 and, through the connecting links 35 and lever arm 34, rotating the shaft 30 in a counterclockwise direction, (Fig. 2). As the connecting links 29 are fixed to the shaft 30, the rotation of the shaft, as described, causes the lower ends of the connecting rod 29 to swing the inner ends of the trays 22 downwardly and inwardly, thus causing the assemblage consisting of the bread trays 22 and oven door 23 to pivot upon the rollers 27 as a fulcrum. A continued rotation of the shaft 30, coupled with the downward and inward swing of the lower ends of the connecting rods 29 draws the bread trays 22 rearwardly in to the oven compartment and as soon as the oven door has been moved to a substantially vertical position, the assemblage moves inwardly along the tracks 25 supported by the rollers 27 thereof until the oven door closes the upper front opening of the oven compartment.

As the lever 37 is moved downwardly as above described, rotation is imparted through the connecting links 43 and lever arm 45 to the shaft or rod 46 located in the lower part of the oven compartment, thus swinging the arm 47 secured to the other end of the rod 46 in the housing 32 and also causing this arm 47 to be swung in a counterclockwise direction (Fig. 3). Fig. 3 it will be remembered shows the parts in a position corresponding to Fig. 2 with the bread trays and oven door in a non-cooking position. With the parts in this position, as shown in Fig. 3, the plate 50 is held by the spring 52 so that the notch 53 in said plate is in engagement with the roller 48a on pin 48 of the lever 47. Therefore, as the lever 47 is swung in a counterclockwise direction, the engagement of the pin 48 with said notch 53 causes the plate 50 to be moved with a translatory motion inwardly towards the rear of the device. As the inner end of the plate 50 is pivotally connected to the latch carrying plate 51, the latter is also caused to be rotated in a counterclockwise direction, as indicated by the arrow A in Fig. 6 of the drawings. Rotation of the plate 51 in this direction will wind the main spring 59, as will be readily understood from an inspection of Fig. 6 of the drawings. As the latch carrying plate 51 is so rotated, the tooth 68b of the latch 68 will ride upon the periphery of the dog 65 until after the tooth 68b passes the catch 65b, at which time the tooth 68b will be caused to spring in behind the notch 65b under the influence of the spring 69a, the tooth 68a of the latch 68 at the same time engaging with the catch 65a of the dog 65, the parts then being in the full line position shown in Fig. 6.

Shortly before the teeth 68a and 68b of the latch 68 engage respectively with the catches 65a and 65b the roller 70 carried by the end of the latch 68 passes over and behind the cam arm 71. During the movement of the latch carrying plate 51 the pin 48 and roller 48a of the lever 47 is swinging through the slot 54 of the latch plate 55 and when the tooth 68b of the latch 68 has engaged with the catch 65b the pin 48 will have moved to the end of the slot 54 and into alignment with the notch 57 at the end of said slot. Just at the instant this occurs, a pin 105 which projects laterally from the side of the latch plate 55, will be engaged by a downwardly projecting cam face 106 formed on the plate 50, thus causing the plate 50 to be rotated upon its pivotal connection 50a with the latch carrying plate 51 and swinging the outer end of the plate 50 upwardly so that the notch 53 in said outer end is disengaged from the pin 48 and, as the latch plate 55 has its pivot point at 56 considerably to the rear of the center of gravity of said plate 55, the forward end of the plate 55 will drop and cause the notch 57 at the rearward end of the slot 54 to move downwardly into engagement with the pin 48 thereby holding the lever 47 and associated parts in the position shown in Fig. 5 of the drawings, with the bread carrying trays 22 held entirely within the oven compartment and with the oven door 23 in its fully closed position.

During the rotation of the latch carrying plate 51, as above described, rotation of the main driving gear 66 of the time controlled mechanism will be prevented by the escapement 61, and as a certain overthrow of the motion of the plate 50 is required to insure engagement of the notch 57 with the pin 48, during which time the tooth 68a of the latch 68 is in engagement with the catch 65a of the dog 65 so that the dog is rotated a certain extent, relative movement between the dog 65 and gear 66 is permitted through the frictional engagement of the discs 67 with the side faces of the gear 66. On reference to Figs. 3, 5 and 6 it will be apparent that as soon as the parts have reached their latched position the plate 51 will be rotatably connected with the latch plate 65 and through this latch plate to the escapement mechanism, the wound spring 59 providing the power for driving the escapement by forcing rotation of plate 51 and the latch plate 65, and consequently the escapement which is operated by gear 66. That the plate 51 is free to rotate will be apparent on reference to Figs. 5 and 6 since when the parts come into final position to effect a latch, the plate 50 is moved upwardly by contact with a pin 105 and by the upward movement the pin 48a is moved out of contact with the notched portion of the slot 49 in plate 50 (see Fig. 12) to effect a release of plate 50 by allowing sliding movement of pin 48a in the straight portion of said slot 49. Since the plate 50 is free to slide, the plate 51 is free to rotate as controlled by the escapement and the spring 59. It is understood that the above mentioned escapement mechanism, driven from gear 66, is constructed and functions in the usual manner of time control mechanisms employing a balance wheel and an escapement. In effect the plate 51 is first actuated to wind spring 59 and at the end of this winding operation the spring and its attached parts are latched to an escapement, and then plate 51 is released leaving the mechanism free to rotate at a timed rate.

It will be understood that before the handle 38 and lever 37 are actuated to move the bread trays into the oven, the timer lever 80 for ordinary toast will be adjusted to bring the pointer 80a in registry with the pointer 77a of the thermostatically controlled indicator, whereas when either lighter or darker toast is desired, the lever will be adjusted up or down towards the "Light" or "Dark" end of the scale 80b. If the toaster has been employed for some time for a series of toasting operations during which the gas flame has been fully turned on, obviously the temperature of the oven will be much higher than when the toaster has not been so continuously used. An elevated temperature of the oven tends to move the indicating pointer under the control of the thermostat 75 upwardly along the scale 78. If the pointer 77a is located somewheres in the upper region of the scale and the pointer 80a carried by the lever 80 is moved into registry with it, the cam arm 71 will also be moved upwardly and its relative setting to the roller 70 carried by the latch 68 will be altered, as the point to which the roller 70 is moved through the movement of the bread trays into the oven by the actuation of the lever 38 will always be the same.

During the operation of the parts by the time controlled mechanism the dog 65 will be driven in the clockwise direction indicated by the arrow B in Fig. 6, by the engagement of the tooth 68b of said latch with the catch 65b of the dog 65. After a comparatively slight amount of rotation the roller 70 carried by the end of the latch will ride along the outer end of the cam arm 71 which extends at an angle sufficient to cause the latch 68 to be rotated on its pivot against the action of the spring 69a and disengage the tooth 68b of the latch from the catch 65b of the dog. This will result in immediately releasing the latch carrying plate 51 from the control of the time controlled mechanism. When this occurs the main spring 59 swings the latch carrying plate 51 quickly in the clockwise direction and causes the rear end of the plate 50 to be swung downwardly and engage the projecting lug 55a of the latch plate 55, thus causing the plate 55 to be rotated upon its pivot 105 thereby to swing the notch 57 at the end of the arcuate slot 54 thereof out of engagement with the pin 48. This releases the main latch and permits the lever 47 to swing forwardly in response to the pull of the spring 103. The spring 40 located at the other end of the device also acts at the same time upon the lever 37 raising said lever and through the connecting rod 35 and crank arm 34 rotates the shaft 30 and connecting links 29 to swing the rear ends of the bread trays upwardly, the oven door outwardly and to cause the bread trays and oven door assembly to swing upon the fulcrums provided by the rollers 27 and to move outwardly of the oven compartment to the position shown in Fig. 2.

As hereinbefore pointed out it is desirable to provide means whereby the oven door may be kept closed without turning the gas flame on full, as there are periods in every restaurant during which the demand for toast is at a minimum and it is of course desirable to keep the toaster warm in readiness for instant use during these slack periods and yet reduce the gas consumption to a minimum. It is also desirable to provide means whereby the latching mechanism for holding the bread trays in the oven may be manually released by the operator without the necessity of waiting for the actuation of said latch by the time controlled mechanism. The following mechanism has been provided to accomplish the above results: A tripping and locking lever 110 is pivoted upon a pivot pin 111 and said lever at its forward end projects through a slot formed in the angle plate member 102 and through a similar slot in the end frame member 10, the forward end of the tripping lever terminating in a finger grip 110a, the construction of these parts being shown in Figs. 8 and 9 of the drawings. The slot in the bracket member 102 is shown most clearly in Fig. 8 of the drawings and is designated by the reference character 112, said slot being provided adjacent its upper end with a shoulder 112a and a narrower upwardly extending portion 112b adjacent said shoulder. The finger grip portion 110a of the tripping lever 110 is offset laterally from the main portion of the lever, as shown best in Fig. 9, the lever being formed of sheet metal with an angularly bent portion 110b, as shown in Fig. 9, so that the rear main portion of the lever is held in contact with the main web of the angle plate 102. A spring 113 has its lower end connected to the angular portion 110b of the tripping lever and its upper end anchored to the small bracket 100, said spring extending at an angle, as shown in Fig. 8, and tending to hold the finger grip portion 110a of the lever in contact with the left hand face (Fig. 8) of the slot 112 and at the same time to normally hold the finger grip 110a in contact with the shoulder 112a of the slot 112. A locking pin 114 has its lower end secured to the finger grip 110a, said pin at its upper end passing through, and being guided for movement in, a suitable aperture provided in a laterally projecting lug 100a struck out from the bracket 102, the upper end of the locking pin 114 being located immediately below (when the finger grip 110a is engaged with the shoulder 112a) a small hole 101a provided in the slide 101.

At its rear lower end, the tripping lever 110 is provided with a laterally projecting tripping arm 110d which projects below the lower forward extremity of the locking plate 55 when the parts are in their locked position with the bread trays located within the oven compartment. From the foregoing it will be readily understood that when the finger grip 110a is moved downwardly in the slot 112 the rear end of the tripping lever 110 will be moved upwardly causing the lug 110d to engage the latch plate 55, rotating the same on its pivot 56 and moving the notch 57 in said plate out of engagement with the pin 48.

When, however, the finger grip 110a is moved upwardly into the slot 112b the locking pin 114 will enter the hole 101a of the slide 101 and will prevent the slide from being pulled inwardly by the spring 103 when in slack period the oven door is closed by operating the handle 38; thus preventing the automatic opening of the gas valve 95 by the lever 98. As it will obviously be necessary to provide means to prevent the time controlled mechanism from releasing the latch plate 55 during the slack periods of use, the tripping lever 110 is provided at its upper rear end with a second laterally projecting stop lug 110c which is adapted to be moved downwardly to project in front of the forward edge of the plate 50 so as to lie in the path of movement of said front edge and act as a stop to prevent the rotation of the latch carrying plate 51 by the time controlled mechanism.

In order to provide an adjustment of the gas flame for different gas pressures or varying conditions, a small lever 115 has its rear end pivoted at 115a upon the angle bracket 102, the front end of the lever projecting through a slot in the bracket member 102 and through the side frame member 10 so as to be accessible to the operator at the front of the machine. At a point intermediate to its ends there is pivotally secured to the lever 115 the upper end of a wedge shaped member 116, the lower end of which projects through a slot formed in the slide 101. Movement of the lever 115 downwardly will cut down the amount of flame when in normal operation the gas valve 95 is automatically opened whereas upward movement of the lever 115 will increase the flame.

The operation, of what may be termed the auxiliary parts, is as follows: As has already been described in the normal operation of the device, when there is a fairly continuous demand for its use, after the bread or sandwiches to be toasted have been inserted into the trays 22 and the handle 38 is moved downwardly to swing the trays into the oven and the oven door into closed position, at which time the bread carrying assembly will be held by the latch plate 55 in closed position and under the control of the time controlled mechanism, the slide 101 is moved rearwardly by spring 103 to cause the bell crank lever 98 to swing upon its pivot and press the valve actuating rod 97 inwardly to hold the gas valve 95 open and thus provide a full flame from each of the gas jets 20 in the oven compartment. At the end of the toasting operation, the time controlled mechanism automatically causes the release of the latch plate, as hereinbefore described, and the movement of the bread trays out of the oven, and of the oven door to open position, also automatically occurs with a return movement of the slide 101, bell crank 98 and valve actuating rod 97 to a position to cut down the flame to a small pilot flame. Should it be found necessary or desirable to trip the latch plate before its actuation by the time controlled mechanism the finger grip 110a is depressed to the lower part of the slot 112, thus moving the tripping lug 110b at the rear end of the tripping lever 110 upwardly, throwing the latch plate 55 upwardly, and releasing the notch 57 from the pin 48, as will be readily understood.

When the slack periods of use occur, the finger grip 110a is then moved laterally towards the right in Fig. 8 to disengage said finger grip from the shoulder 112a at which time the spring 113 will pull the finger grip portion of the tripping lever 110 upwardly into the upper reduced end 112b of the slot and so that the upper end of the locking pin 114 will move upwardly into the hole 101a of the slide 101. When the tripping lever 110 has been moved to its upper position as just described the stop lug 110c of the tripping lever will then be located in the path of movement of the plate 50 and will stop the actuation of the time controlled mechanism.

In order to insure the greatest possible accuracy of the thermostatically controlled indicator 77 this member is made as light as possible and is provided with a counterbalancing portion 77b so as to locate its center of gravity substantially at the axis of its pivotal mounting. As a further assurance of the greatest possible sensitivity of the thermostatic indicator a sheet of suitable insulating material, such as asbestos, as indicated by the reference character 120, is preferably mounted upon the inner face of the inner wall 14 between the bi-metallic thermostat 75 and said inner wall; the exposed face of the insulating sheet 120 preferably being covered with a sheet of aluminum foil to insure a minimum absorption of the heat, therefore a minimum radiation of heat when the gas flame is reduced.

In toasting a piece of bread which is held stationary relatively to a stationary source of heat, particularly when the bread and heating elements are vertically positioned, it is a problem of considerable difficulty to secure uniform toasting effects, especially when the heating elements are of the gas fired type. Normally the gas flame, when employed in combination with a ceramic radiant, produces appreciable higher temperatures at the bottom of the radiant than at the top. This problem has been most efficiently solved in the present construction by providing the side walls of the radiants adjacent the bottom thereof with a plurality of large holes 21a, through which is entrained a cooling current of secondary air, the secondary air thus entrained sweeping over the inner faces of the side radiants at the bottom thereof between the flame and radiant and producing an appreciable cooling effect. In addition a very much larger number of the projecting pin like protuberances 125, with which radiants of this type are ordinarily provided, have been supplied adjacent to the top portions of the radiant than is provided at the bottom thereof.

As will be seen by referring to Fig. 2 of the drawings, the front plate of the crumb tray 150 is located in front of the forward end of the cross brace member 41 and said front plate projects sufficiently above the lower front end of the cross brace member so as to catch and deflect into the crumb tray any crumbs that might tend to fall off of the bread carrying trays 22 when the latter is pulled forwardly to the position shown in Fig. 2. The front plate of the crumb tray also serves as a closure for the bottom front part of the oven compartment and when the crumb tray is fully inserted into the oven compartment, this front plate prevents the entry into the oven compartment of an excessive amount of cooling air that would tend to cool the oven too rapidly. As a further precaution against too rapid cooling of the oven, the top oven door 23, to which the bread carrying trays 22 are secured, is provided with the side wing or baffle members 23a which, as clearly shown in Fig. 2, serve as barriers to prevent ingress of air between the opened oven door 23 and front side wall portion of the oven.

As hereinbefore pointed out the handle 38 which is attached to the front end of the lever 37, is of novel construction and this handle consists of a piece of sheet metal bent to a substantially U shape, the end of each leg of the U being bent inwardly to form a small flange or grip portion 38a, adapted to engage within a slot 38b formed in the forward portion of the lever 37. The connecting web portion 38c of the handle is also formed with a central slot into which the front end of the lever 37 projects. The lever 37 is preferably constructed of a piece of flat steel of about the same thickness as the handle member 38. Approximately at the center thereof each of the flanges 38a is also formed with a slot into which the side edge portions of the lever member at the slot 38b are adapted to be received.

As will be seen from the foregoing, the handle 38 may be readily assembled upon the lever 37 by inserting the extreme front end of the lever into the slot of the web portion 38c, the rearward end of the handle 38a is then moved sidewise to bring the flanged portion 38a thereof into the slots 38b until the central slots in the flanged portion 38a snap into interlocked engagement with the lever 37; it being understood that in bending the handle 38 into its U shape the opposed faces of the flanges 38a are brought sufficiently close together so that inherent resiliency in the member 38 will cause the flanges 38a to snap into engagement with their slotted portions interlocked with the lever 37. This handle construction is, as will be readily understood, very simple and inexpensive and as there is but a very small contacting area between the handle 38 and lever 37, while at the same time the handle 38 has a relatively large exposed surface area, the handle 38 will remain sufficiently cool to be handled, even though the lever 37 may become quite hot because of its close proximity to the heated oven compartment.

As will be seen from the foregoing a toaster constructed in accordance with the principles of the present invention, although one which includes a thermostatic device and a time controlled mechanism for governing the length of toasting operation, the length of the toasting operation is not directly controlled by the thermostat but the thermostatic device is employed merely as an indicator for showing the approximate temperature of the oven compartment and the period of the toasting operation is governed by the manual setting of the timer lever 80 so its indicating pointer 80a normally will coincide with the indicating pointer 77a of the indicator 77, the differential connecting means between the timer lever 80a and the setting lever 72 insuring a setting of the time controlled mechanism that will result in the production of properly browned toast even when the device is placed in the hands of a relatively unskilled operative.

The means for holding the bread carrying trays in the oven during a toasting operation, it will be noted, consists of what may be termed a primary latching device of relatively sturdy construction which primary latching device is under the control of a secondary latching means of sufficiently light but sensitive construction to be actuated by the time controlled mechanism.

There is also included a manually operated means for releasing the primary latching means whenever it is found necessary or desirable to do so.

The device also includes an automatic means for increasing and decreasing the flow of gas when, in normal operation, the toaster being more or less continuously used is actuated to place the bread trays in the oven compartment and to close the door thereof, together with means for preventing the operation of the gas valve during the slack periods of use when the oven door has been moved to its closed position to prevent the escape of heat from the oven compartment, and to maintain the same at a sufficiently elevated temperature so that toast may be made without the lapse of too long a time interval such as would otherwise be necessary for bringing a cold oven up to toasting temperature.

While there is disclosed herein a satisfactory, constructional example that has operated efficiently in actual commercial use, it will be understood that the invention is not limited to the specific constructional details herein described and illustrated but that many changes, modifications and variations may be resorted to without departing from such principles.

We claim:

1. In a device of the character described, an oven containing a plurality of vertically arranged spaced heating elements, a unitary assembly comprising a plurality of food carrying trays movable in the space between said heating elements into and out of said oven compartment, an oven door to which said trays are connected, guide ways for supporting said assembly, fulcrum connections between said assembly and said guide ways upon which connections said assembly is supported in a position of unstable equilibrium, a manually operable lever and connections from said lever to said assembly to effect a swinging of said assembly from an inclined to a substantially horizontal position and simultaneously effecting a translatory movement of said assembly into said oven.

2. A culinary device of the type wherein food carrying means are manually movable into a cooking compartment, held therein for a predetermined time interval and automatically moved out of said compartment at the end of said time interval under the control of a time controlled mechanism, characterized by a primary latching means for holding said food carrying means within said compartment, a secondary latching means connected with said time controlled mechanism and said primary latching means, said secondary latching means including a latch carrying plate, a connecting lever between said latch carrying plate and said primary latching means, the time controlled mechanism including a main spring connected with said latch carrying plate, a manually operable member for moving said food carrying means into said oven compartment and a common connection between said manually operable member, said primary latching means and said connecting lever for engaging said connecting lever to cause the latter to wind the time controlled mechanism as said food carrying means is moved into the cooking compartment and subsequently to engage said primary latching means to hold the food carrying means in cooking position.

3. A culinary device of the type wherein food carrying means are manually movable into a cooking compartment, held therein for a predetermined time interval and automatically moved out of said compartment at the end of said time interval under the control of a time controlled mechanism, characterized by a primary latching means for holding said food carrying means within said compartment, a secondary latching means connected with said time controlled mechanism and said primary latching means, said secondary latching means including a latch carrying plate, a connecting lever between said latch carrying plate and said primary latching means, the time controlled mechanism including a main spring connected with said latch carrying plate, a manually operable member for moving said food carrying means into said oven compartment, a disengageable connection between said connecting lever and said manually operable member, means for automatically making said connection operative during the movement of said food carrying means into said cooking compartment, means for automatically releasing the connection between said member and lever at the end of said movement and simultaneously connecting said manually operable member with said latching means.

4. A culinary device of the type wherein food carrying means are manually movable into a cooking compartment, held therein for a predetermined time interval and automatically moved out of said compartment at the end of said time interval under the control of a time controlled mechanism, characterized by a primary latching means for holding said food carrying means within said compartment, a secondary latching means connected with said time controlled mechanism and said primary latching means, said secondary latching means including a latch carrying plate, a connecting lever between said latch carrying plate and said primary latching means, the time controlled mechanism including a main spring connected with said latch carrying plate, a manually operable member for moving said food carrying means into said oven compartment, a disengageable connection between said connecting lever and said manually operable member, means for automatically making said connection operative during the movement of said food carrying means into said cooking compartment, means for automatically releasing the connection between said member and lever at the end of said movement and simultaneously connecting said manually operable member with said latching means, means for releasing the secondary latching means at the end of a predetermined time interval and cooperating members on said connecting lever and primary latching means for effecting the release of the latter upon release of said secondary latching means.

5. In a device of the character described an oven, food carrying means movable into and out of said oven, an indicator responsive to variations in the temperature of said oven, latching means for automatically locking said food carrying means within said oven, means for automatically releasing said latching means at the end of a predetermined time interval, including a time controlled mechanism, a setting device connected with said time controlled mechanism for varying the said time interval, a manually operable indicating device positioned near said indicator whereby said indicator serves as a point of reference for positioning said manually operable indicating device, and a linkage providing a variable relative movement between said manually operable device and said setting device.

6. In a device of the character described an oven compartment, a heat responsive member automatically responsive to variations of the temperature within said oven, an indicator actuated thereby, food carrying means movable into and out of said oven, means for normally urging said food carrying means outwardly of said oven, a primary latching device for holding said food carrying means within said oven, a secondary latching device including a time controlled mechanism connected with said primary latching device, and a setting mechanism for varying the time interval of the operation of said time controlled mechanism, including indicating means positioned near said indicator whereby said indicator serves as a point of reference for indicating the proper position of said setting mechanism indicating means for control of the cooking period.

7. In a culinary device of the type wherein food carrying means are movable into an oven compartment and at the end of a predetermined time interval out of said compartment, characterized by means for normally urging said food carrying means to an inoperative position out of said oven compartment, manually operable means for moving said food carrying means into operative position within said oven compartment, a primary latching means automatically operative to hold said food carrying means in its operative position within said oven compartment, a secondary latching means including a time controlled mechanism having a winding spring, connections between said secondary latching means and said primary latching means, cooperating members on said connections and primary latching means for moving the primary latching means into latched engagement when said food carrying means is moved into said oven compartment, and means for contacting said primary latching means and causing same to be released at the end of a predetermined time interval after release of said secondary latching means by said time controlled mechanism.

8. A device as set forth in claim 7 in which are provided a member responsive to variations in the temperature of said oven compartment, an indicator actuated by said oven temperature responsive member, means for setting said time controlled mechanism, and indicating means associated with the latter so positioned that said indicator serves as a point of reference thereby enabling the time controlled mechanism to be set for actuation at the end of a predetermined time interval in accordance with variations in temperature of the oven compartment as shown by said indicator.

9. A device as set forth in claim 7 in which are provided a member responsive to temperature variations in the oven compartment, an indicator actuated by said oven temperature responsive member, an indicating scale cooperatively associated with said indicator, a manually operable indicating means cooperatively associated with said scale and said indicator but movable independently of said indicator, time setting means for varying the time interval operation of the time controlled mechanism, and connections between said manually operable indicating means and said time setting means.

10. A device as set forth in claim 7 in which are provided a thermostatically controlled indicator responsive to temperature variations in the oven compartment, an indicating scale cooperatively associated with said indicator, a manually operable indicating means cooperatively associated with said scale and said indicator but movable independently of said indicator, time setting means for varying the time interval of operation of the time controlled mechanism, and a linkage providing a variable relative movement between said manually operable indicating means and said time setting means.

11. A culinary device of the type wherein food carrying means are manually movable into an oven compartment and held within said oven compartment for a predetermined time interval, characterized by heating means within said oven compartment and means for supplying fuel to said heating means, including a valve movable from a substantially fully opened position to a partially opened position, latching means for holding said food carrying means in said oven compartment, a time controlled mechanism for releasing said latching means at the end of a predetermined time interval, connections between said latching means and said valve for normally holding the latter in its fully opened position when said food carrying means is within said oven and for moving said valve to its partially opened position when said food carrying means is moved out of said oven compartment, and a manually operable setting mechanism provided for causing said valve to be held in its partially open position when said food carrying means is moved into said oven compartment.

12. A culinary device of the type wherein food carrying means are manually movable into an oven compartment and held within said oven compartment for a predetermined time interval, characterized by heating means within said oven compartment and means for supplying fuel to said heating means, including a valve movable from a substantially fully opened position to a partially opened position, latching means for holding said food carrying means in said oven compartment, a time controlled mechanism for releasing said latching means at the end of a predetermined time interval, connections between said latching means and said valve for normally holding the latter in its fully opened position when said food carrying means is within said oven and for moving said valve to its partially opened position when said food carrying means is moved out of said oven compartment, a stop means for preventing the release of said latching means by said time control mechanism, and connections between said stop means and said valve actuating means for holding the valve in its partially open position when said stop means is made effective.

LESTER E. PADELFORD.
JOHN J. AMBROSE.